United States Patent [19]

Schefcsik et al.

[11] Patent Number: 5,076,402
[45] Date of Patent: Dec. 31, 1991

[54] ADJUSTING DEVICE FOR THE BRAKE SHOES OF INSIDE SHOE BRAKES

[75] Inventors: Nikolaus Schefcsik, Schwaikheim; Emil Näumann, Reichenbach, both of Fed. Rep. of Germany

[73] Assignee: Daimler-Benz AG, Fed. Rep. of Germany

[21] Appl. No.: 545,491

[22] Filed: Jun. 29, 1990

[30] Foreign Application Priority Data

Jul. 14, 1989 [DE] Fed. Rep. of Germany ....... 3923375

[51] Int. Cl.⁵ .............................................. F16D 65/46
[52] U.S. Cl. ............................ 188/196 M; 188/79.61; 188/196 V; 188/331; 188/343; 192/111 T
[58] Field of Search .......... 188/196 M, 196 R, 196 V, 188/79.57, 79.61, 343, 341, 331, 332; 192/111 T

[56] References Cited

U.S. PATENT DOCUMENTS

| 1,771,011 | 7/1930 | Sauzedde | 188/79.61 X |
| 1,946,032 | 2/1934 | Parker | 188/79.61 X |
| 2,036,385 | 4/1936 | Amirault | 188/79.61 X |
| 2,190,978 | 2/1940 | Dick | 188/79.61 X |
| 2,376,686 | 5/1945 | Goepfrich | 188/343 X |
| 2,609,066 | 9/1952 | Ross | |
| 3,977,500 | 8/1976 | Farr | |

FOREIGN PATENT DOCUMENTS 567716 1/1933 Fed. Rep. of Germany .
1379136 1/1975 United Kingdom .

Primary Examiner—George E. A. Halvosa
Attorney, Agent, or Firm—Evenson, Wands, Edwards, Lenahan & McKeown

[57] ABSTRACT

An adjusting device is disclosed for the brake shoes of inside shoe brakes. The adjusting device includes two levers which are articulated on a carrier at a lateral distance from one another. The levers each engage on one of two adjacent brake shoe ends and are jointly in engagement with a frustoconical endpiece of an actuating member guided rotatably on the carrier in a threaded bore provided between the levers and extending in parallel with a brake drum axis. During the rotation of the actuating member for the adjustment of the brake shoes, the two levers are pivoted in directions opposite to one another, being supported respectively on one of two mutually opposite edges of the brakeshoe webs so as to surround these. The adjusting device is merely attached by its levers on to the brake shoe webs so it can also execute self-reinforcing floating movements of the brake shoes in dual servo-brakes.

12 Claims, 1 Drawing Sheet

ADJUSTING DEVICE FOR THE BRAKE SHOES OF INSIDE SHOE BRAKES

BACKGROUND AND SUMMARY OF THE INVENTION

The invention relates to an adjusting device for the brake shoes of inside shoe brakes which is assigned to mutually adjacent ends of two brake shoes connected to one another via a tension spring, and which has adjusting members which each engage on one of the brake shoe ends and are mounted on a carrier and which are jointly adjustable in mutually opposite directions by means of an actuating member which is arranged rotatably in a threaded bore extending in the carrier between the adjusting members in parallel with the drum axis and which is supported with a conically tapered endpiece between the adjusting members.

An adjusting device of this genera type is already known from German Patent Specification 567,716. It affords the advantage of a uniform setting or adjustment of brake shoes.

The carrier of this adjusting device forms a guide housing which is built on to the brake carrier and in which are arranged displacably as adjusting members two mutually opposite support pins, each articulated with their outer end on the web end of a brake shoe and with their inner end being in engagement with the circumference of a conically tapered endpiece of an actuating member. This actuating member is arranged rotatably by means of a threaded shank in a threaded bore extending in the guide housing between the support pins in parallel with the axis of the brake drum. At the same time, the inner ends of the support pins are made wedge-shaped and each engage positively into one of engagement grooves formed on the circumference of the conically tapered endpiece of the actuating member at equal angular intervals along generatrices.

In order to set or adjust the brake shoes, the actuating member has to be rotated correspondingly, and as a result of its threaded guide it shifts in the axial direction and at the same time presses the support pins apart correspondingly transversely in relation to the drum axis. This adjusting device, because of its guide housing fixed to the brake carrier, is suitable only for those drum brakes of which the brake shoes are mounted pivotably on the brake carrier (Simplex brakes). At the same time, the production of the guide housing involves a high outlay in manufacturing terms, in that it has to be equipped with special guide bores for the support pins and therefore has to be produced and machined as a shaped body. Finally, the mounting of the device is complicated and time-consuming, since both the guide housing has to be built on to the brake carrier and the support pins have to be connected pivotably to the brake-shoe webs.

An object on which the invention is based is to improve an adjusting device of the above-noted type in such a way that it is characterized by the simplest possible design and can also be installed both in Simplex brakes and in dual servo-brakes.

According to the invention, this object is achieved by providing an arrangement wherein the adjusting members are levers which are pivotable about respective axes extending perpendicular relative to the axis of the actuating member and which are supported on one edge of a respective brake-shoe web so as to surround the same.

The design according to the invention of the adjusting members as levers articulated on the carrier allows a compact and simple carrier design as a sheetmetal shaped article. Because the levers are each supported with their front end on one edge of a brake shoe web and also surround this edge laterally, it is possible merely to attach the adjusting device on to the brake shoe webs in order to arrange it in inside shoe brakes. Its mounting can therefore be carried out completely independently of the brake carrier and without the aid of any fastening means. Accordingly, it can also execute brake-reinforcing movements of brake shoes. In comparison with the design according to German Patent Specification 567,716, an embodiment of the invention wherein the conically tapered endpiece of the actuating member is rotationally symmetrical affords the important advantage of a continuous brake shoe adjustment.

Further advantageous features of preferred embodiments of the invention are the subject of the dependent claims.

In addition to the adjusting device according to German Patent Specification 567,716, U.S. Pat. No. 3,977,500 —FIG. 5—already makes known an adjusting device which, in a generally similar way to the invention, has two adjusting levers which each surround with their one end a respective edge of a brake shoe web and which are supported with their other end on an actuating member. These adjusting levers are arranged within a guide housing fastened to the brake carrier and can be adjusted there from the outside by means of an actuating member.

The use of this adjusting device is therefore likewise restricted to Simplex brakes.

Similar conditions are present in an adjusting device according to U.S. Pat. No. 2,609,066. Its adjusting levers are made double-armed, being respectively articulated with their outer end on the end of a brake shoe web, with their inner end on one another and with their middle part on a brake carrier. Their inner lever ends connected to one another in an articulated manner interact with an adjusting screw.

Apart from the fact that the mounting of this adjusting device can be carried out only with difficulty, its use in dual servo-brakes is likewise impossible because of the articulation of the adjusting levers on the brake carrier.

Other objects, advantages and novel features of the present invention will become apparent from the following detailed description of the invention when considered in conjunction with the accompanying drawings.

DETAILED DESCRIPTION OF THE DRAWINGS

Figure 1:
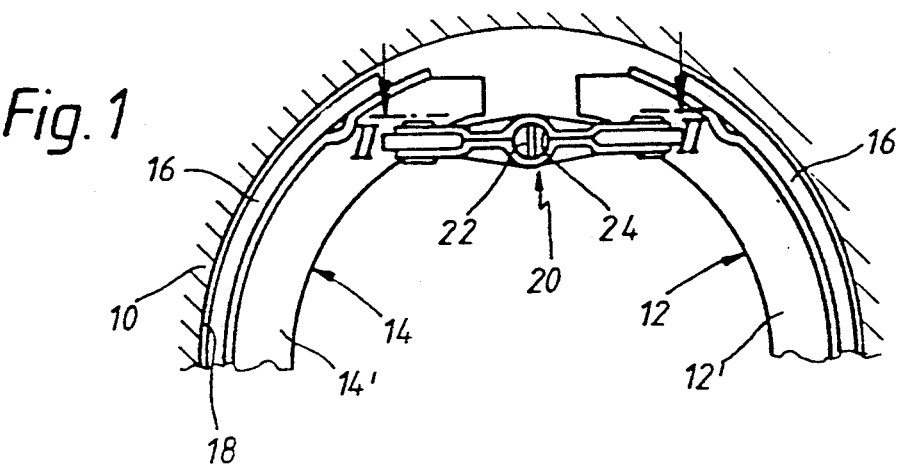
FIG. 1 schematically shows a part front view of a drum brake, as seen from the outside of the wheel, with an adjusting device according to the invention being assigned to its brake shoes.
Figure 1A:
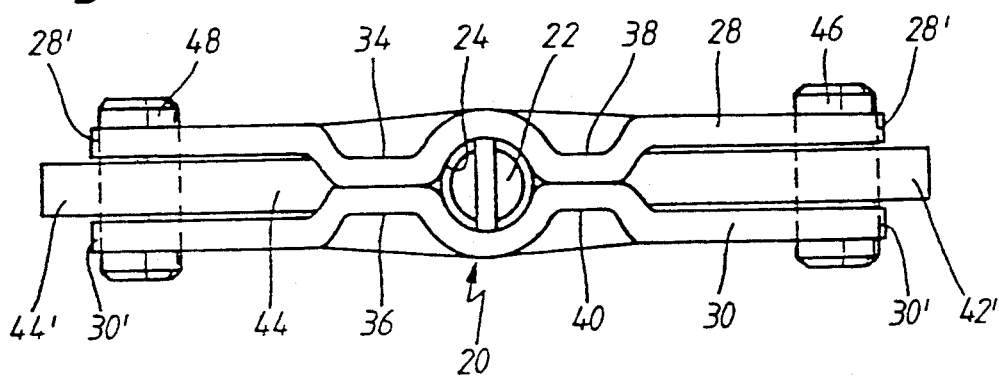
FIG. 1a shows a front view of the adjusting device shown enlarged.
Figure 2:
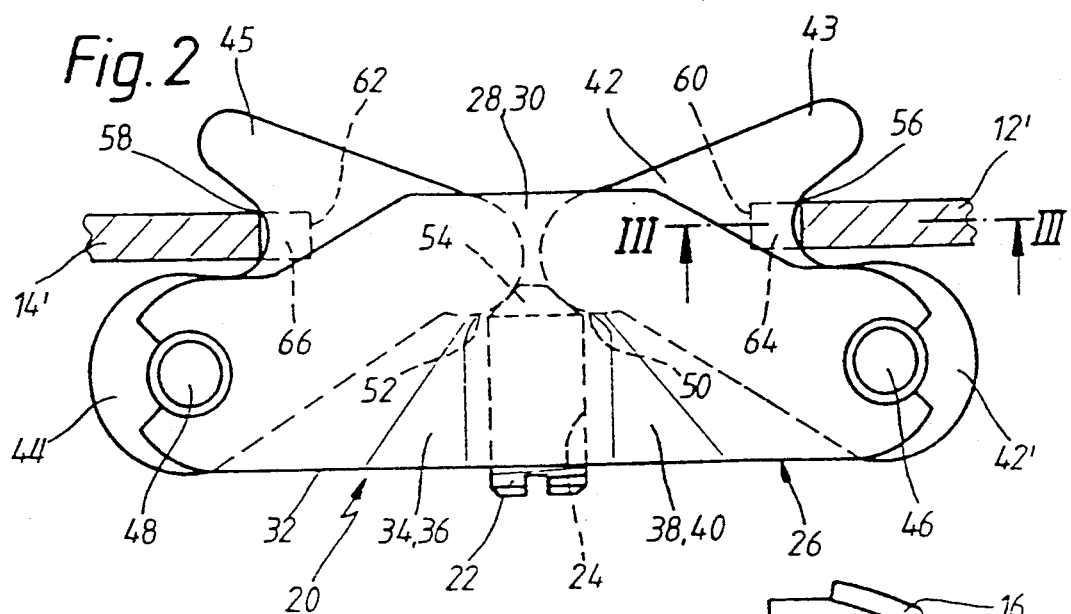
FIG. 2 shows a part section along the line II—II of FIG. 1 on an enlarged scale.
Figure 3:
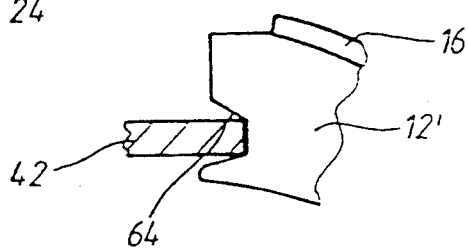
FIG. 3 shows a part section along the line III—III of FIG. 2.

In FIG. 1, 10 denotes a drum casing of a brake drum. Arranged within the drum casing 10 are two brake shoes 12 and 14 which, by means of an actuating device not shown, can be laid with their brake lining 16 against the inner circumferential face 18 of the drum casing 10 for the braking of a vehicle wheel.

Reference numeral 20 denotes as a whole an adjusting device which is assigned to mutually adjacent ends of the two brake shows 12 and 14, said ends being connected to one another via a tension spring not shown. By means of the adjusting device, the lifting play between the brake linings 16 and the inner circumferential face 18 of the drum casing 10 can be set or adjusted uniformly for the two brake shoes 12, 14.

For this purpose, the adjusting device 20 is in each case supported on one of the brake shoe webs 12' and 14' respectively at their mutually confronting free end region. By means of an actuating member, for example in the form of a grub screw 22, guided parallel to the drum axis on the adjusting device 20, the brake shoe adjustment can be carried out from the front side of the wheel by means of an adjusting tool, for example in the form of a screw driver, as a result of the rotation of the grub screw 22. For this purpose, the arrangement of the adjusting device 20 on the brake shoes 12 and 14 is such that the threaded bore 24 receiving the grub screw 22 is located on the reference circle of the wheel-screw bores.

The adjusting device 20 has a carrier 26 constituting a housing and formed, for example, by two plates 28 and 30 which, in the region of their one longitudinal edge 22, are deformed in such a way symmetrically relative to one another at the longitudinal center that, on the one hand, a central orifice for producing the threaded hole 24 and, on the other hand, lower mutually touching surface portions 34 and 36 or 38 and 40 respectively for the welding together of the two plates 28 and 30 could be obtained. It is also possible, however, to form the carrier 26 by means of a U-shaped sheet-metal part, in whose connecting web carrying the U-legs a bore for the actuating member is to be made.

The two plates 28 and 30 form respectively, in the end region of the carrier 26, fork-like bearing legs 28', 30', between which in each case a bearing lug 42' and 44' respectively of a pivoting lever 42 and 44 respectively is held pivotably by means of a bearing journal 46 and 48 respectively. The two pivoting levers 42, 44 are partially swung in symmetrically between the plates 28, 30 and by means of a convexly curved edge portion 50 and 52 respectively are in engagement with a frustoconical rotationally symmetrical endpiece 54 of the grub screw 22.

Formed on the free end of the pivoting levers 42 and 44 respectively is a nose-like extension 43 and 45 respectively which project from the two plates 28 and 30 and which extend in mutually opposite directions. These form in each case, in the transitional region to the bearing lug 42' and 44' respectively, a recess 56 and 58 respectively widening in a V-shaped manner in the outer edge region of the pivoting levers 42, 44. The latter thereby acquire a hook-shaped configuration.

To fasten the adjusting device 20, it is to be introduced with its two pivoting levers 42 and 44 respectively into a marginally open clearance 64 and 66 respectively in each case of the particular brake shoe webs 12' and 14'. At the same time, the brake shoe webs 12' and 14' are supported in the respective recess 56 and 58 of the pivoting levers 42 and 44, so that the latter are held securely in position on these merely by attachment. At the same time, simply a shoulder, with which one of the pivoting levers 42 or 44 is in engagement, can also be formed on the end edge 60 or 62 of the brake shoe webs 12' or 14'.

The adjusting device 20 is thus held via its pivoting levers 42 and 44 respectively in the web clearances 64 and 66, in such a way that it is arranged in a floating manner within the brake drum and is therefore capable of executing the movement for the self-reinforcement of the running-on brake shoe for pressing down the further likewise running-on brake shoe. At the same time, the mounting of the device is carried out very simply. The setting or adjustment of the brake shoes 12 and 14 is to be brought about by an appropriate rotation of the grub screw 22, the conical endpiece 54 of which spreads the pivoting levers 42 and 44 apart from one another. The grub screw 22 itself is guided in the threaded hole 24 in a self-locking manner. The adjusting device 20 constitutes a setting lock which is simple to handle, is light and has small dimensions and which is also equally advantageously suitable for the setting and adjustment of brake shoes installed in the disc pot of brake discs.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Adjusting device for the brake shoes of inside shoe brakes, which is assigned to mutually adjacent ends of two brake shoes connected to one another via a tension spring, and which has adjusting members which each engage on one of the brake shoe ends and are mounted on a carrier and which are jointly adjustable in mutually opposite directions by means of an actuating member which is arranged rotatably in a threaded bore extending in the carrier between the adjusting members in parallel with the drum axis and which is supported with a conically tapered endpiece between the adjusting members, wherein the adjusting members are levers which are pivotable about respective axes which are perpendicular relative to the edge of a respective brake shoe web so as to surround the same, and wherein said adjusting device is held in a floating manner via its levers engaged with the respective brake shoe webs.

2. Adjusting device according to claim 1, wherein the conically tapered endpiece of the actuating member is rotationally symmetrical.

3. Adjusting device according to claim 2, wherein the levers are mounted between fork-shaped endpieces of the carrier formed by two plates held at a distance from one another and are partially swung in between the plates for support on the actuating member.

4. Adjusting device according to claim 3, wherein carrier is held at the brake shoe ends on a side facing a brake-drum bottom, and wherein the actuating member is designed as a self-locking screw and is rotatable from the outside of the wheel.

5. Adjusting device according to claim 2, wherein the levers bear with a convexly curved edge portion on the actuating member.

6. Adjusting device according to claim 2, wherein the carrier is held at the brake shoe ends on a side facing a brake-drum bottom, and wherein the actuating member is designed as a self-locking screw and is rotatable from the outside of the wheel.

7. Adjusting device according to claim 1, wherein the levers are mounted between fork-shaped endpieces of the carrier formed by two plates held at a distance from one another and are partially swung in between the plates for support on the actuating member.

8. Adjusting device according to claim 7, wherein the levers bear with a convexly curved edge portion on the actuating member.

9. Adjusting device according to claim 8 wherein the carrier is held at the brake shoe ends on a side facing a brake-drum bottom, and wherein the actuating member is designed as a self-locking screw and is rotatable from the outside of the wheel.

10. Adjusting device according to claim 7, wherein the carrier is held at the brake shoe ends on a side facing a brake-drum bottom, and wherein the actuating member is designed as a self-locking screw and is rotatable from the outside of the wheel.

11. Adjusting device according to claim 1, wherein the levers bear with a convexly curved edge portion on the actuating member.

12. Adjusting device according to claim 1, wherein the carrier is held at the brake shoe ends on a side facing a brake-drum bottom, and wherein the actuating member is designed as a self-locking screw and is rotatable from the outside of the wheel.

* * * * *